US006925821B2

(12) United States Patent  (10) Patent No.: US 6,925,821 B2
Sienel (45) Date of Patent: Aug. 9, 2005

(54) METHOD FOR EXTRACTING CARBON DIOXIDE FOR USE AS A REFRIGERANT IN A VAPOR COMPRESSION SYSTEM

(75) Inventor: Tobias H. Sienel, Easthampton, MA (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/725,896

(22) Filed: Dec. 2, 2003

(65) Prior Publication Data

US 2005/0115253 A1 Jun. 2, 2005

(51) Int. Cl.[7] ............................................. F25B 45/00
(52) U.S. Cl. ............................ 62/149; 62/85; 62/164
(58) Field of Search .......................... 62/77, 85, 149, 62/164, 292, 493

(56) References Cited

U.S. PATENT DOCUMENTS

| 5,035,117 A | * | 7/1991 | Drake ............................ 62/79 |
| 5,233,837 A | * | 8/1993 | Callahan ...................... 62/621 |
| 5,281,254 A | | 1/1994 | Birbara et al. |
| 5,644,933 A | | 7/1997 | Rathbone |
| 5,744,110 A | | 4/1998 | Mimura et al. |
| 6,537,348 B1 | * | 3/2003 | Hirano et al. .................. 95/96 |
| 6,604,367 B2 | * | 8/2003 | Ahmed et al. ................. 62/85 |

FOREIGN PATENT DOCUMENTS

| EP | 0 904 825 | 3/1999 |
| JP | 4283367 | 10/1992 |
| JP | 10153363 | 6/1998 |

* cited by examiner

*Primary Examiner*—Melvin Jones
(74) *Attorney, Agent, or Firm*—Carlson, Gaskey & Olds

(57) ABSTRACT

Carbon dioxide refrigerant is circulated through a vapor compression system including a compressor, a gas cooler, an expansion device, and an evaporator. Carbon dioxide is extracted from a vehicle exhaust stream that includes combustion products of burned hydrocarbon fuel. The extracted carbon dioxide is used to supplement the initial supply of carbon dioxide refrigerant to maintain a desired (or predetermined) level of refrigerant in the system. The system includes a sensor assembly that measures and monitors the amount of refrigerant in the system. In one example, the extracted carbon dioxide is automatically added to the system from a storage tank when a sensor detects that the amount of carbon dioxide refrigerant in the system is below a threshold value. In another example, the extracted carbon dioxide is directly added to the system, and the carbon dioxide refrigerant is purged from the system when a sensor detects that the amount of carbon dioxide in the system exceeds a threshold value.

20 Claims, 2 Drawing Sheets

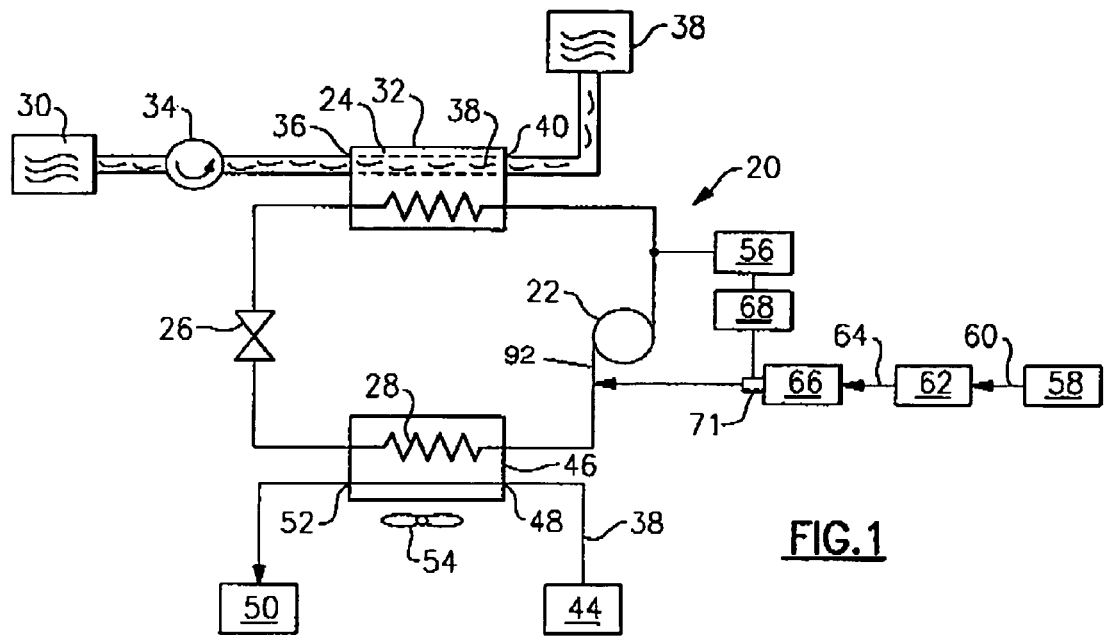
FIG.1
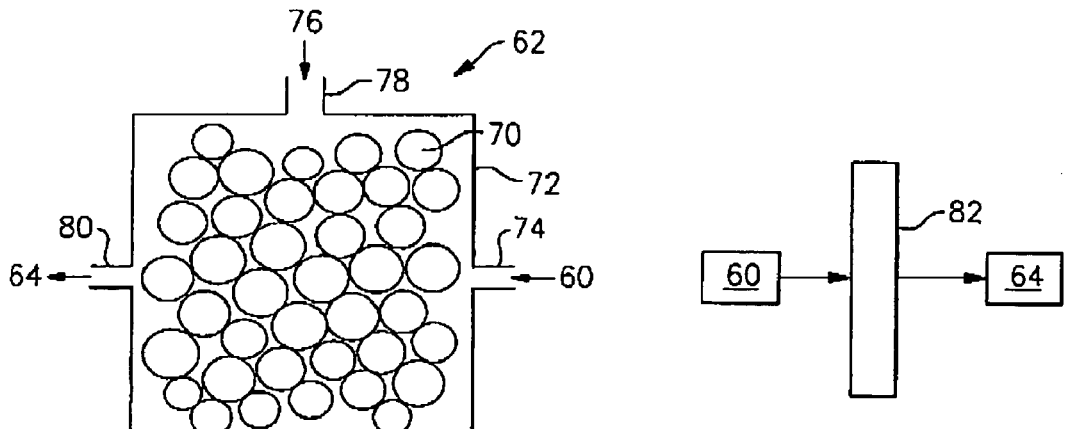
FIG.2
FIG.3

METHOD FOR EXTRACTING CARBON DIOXIDE FOR USE AS A REFRIGERANT IN A VAPOR COMPRESSION SYSTEM

BACKGROUND OF THE INVENTION

The present invention relates generally to a method for extracting carbon dioxide from of an internal combustion engine exhaust and automatically adding the extracted carbon dioxide to a vapor compression system for use as a refrigerant.

Chlorine based refrigerants have been phased out in most of the world due to a possible detrimental effect on the environment. Hydrofluoro carbons (HFCs) have been used as replacement refrigerants, but these refrigerants may still be detrimental to the environment.

"Natural" refrigerants, such as carbon dioxide and propane, have been proposed as replacement fluids. Carbon dioxide can be used as a refrigerant in automotive air conditioning systems and other heating and cooling applications. Carbon dioxide has a low critical point, which causes most air conditioning systems to run transcritically, or partially above the critical point, under most conditions.

The possibility of refrigerant leakage increases when a vapor compression system runs with carbon dioxide due to the high operating pressure. Carbon dioxide systems generally have a high volumetric capacity, and therefore carbon dioxide vapor compression systems have less charge than a system using a conventional refrigerant. Therefore, a refrigerant leak in a carbon dioxide system has a greater influence on the system performance than a leak in a system using a conventional refrigerant. When charge leaks, additional refrigerant must be added to the system. Traditionally, the additional refrigerant is added manually. However, adding additional charge to a vapor compression system is both costly and labor intensive.

Thus, it is desirable to provide a method for automatically adding carbon dioxide refrigerant to a vapor compression system that is not labor intensive and costly, as well as overcoming the other above-mentioned deficiencies of the prior art.

SUMMARY OF THE INVENTION

The present invention relates generally to a method of automatically adding a refrigerant to a vapor compression system. An internal combustion engine produces an exhaust, and the refrigerant is extracted from the exhaust stream and automatically added to the vapor compression system.

In one disclosed embodiment, the carbon dioxide vapor compression system includes a compressor, a heat rejecting heat exchanger, an expansion device, and an evaporator. The compressor compresses a refrigerant to a high pressure and a high enthalpy. As the refrigerant flows through the gas cooler, the refrigerant rejects heat to a fluid medium and exits the heat rejecting heat exchanger at a low enthalpy and a high pressure. The refrigerant is then expanded to a low pressure in an expansion valve. After expansion, the refrigerant flows through an evaporator and accepts heat from the outdoor air. The refrigerant exits the evaporator at a high enthalpy and a low pressure. After evaporation, the refrigerant reenters the compressor, completing the cycle. Carbon dioxide refrigerant is circulated though the closed circuit system.

When hydrocarbons in vehicle fuel are burned in the presence of oxygen, combustion products including carbon dioxide are released. The carbon dioxide is extracted from the combustion products by employing a carbon dioxide extraction system. For example, the carbon dioxide extraction system can be a solid adsorbent, a solution of metal salts, or a carbon dioxide selective membrane.

In one example, the extracted carbon dioxide is directed to a storage tank. When a sensor detects that the amount of carbon dioxide refrigerant in the system is below a threshold value, the sensor sends a signal to a control. The control opens a valve in the storage tank to automatically supply carbon dioxide from the storage tank into the system. The control sends a signal to close the valve when the sensor detects that the amount of refrigerant in the system is above the threshold value.

In another example, the extracted carbon dioxide is directly added to the system after extraction from the combustion products. When a sensor detects that the amount of carbon dioxide in the system is above a threshold value, the sensor sends a signal to a control. The control opens a valve to automatically purge carbon dioxide from the system. The control sends a signal to close the valve when the sensor detects that the amount of refrigerant in the system is below the threshold value.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows:

FIG. 1 schematically illustrates a diagram of a first embodiment of the vapor compression system of the present invention;

FIG. 2 schematically illustrates one example of the carbon dioxide extraction system including zeolite crystals;

FIG. 3 schematically illustrates another example of the carbon dioxide extraction system includes a carbon dioxide selective membrane.

DETAILED DESCRIPTION OF THE PREFERRED EMBODIMENT

Figure 4:
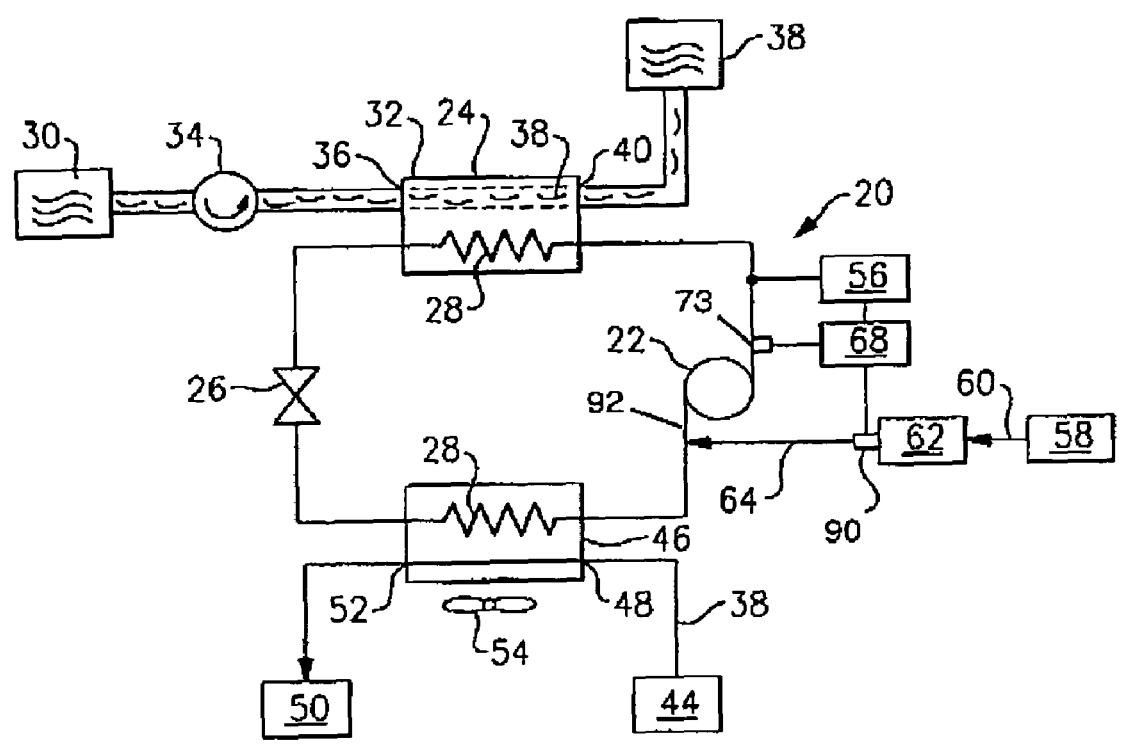
FIG. 4 schematically illustrates a diagram of a second embodiment of the vapor compression system of the present invention.

FIG. 1 illustrates an example vapor compression system 20 that includes a compressor 22, a heat rejecting heat exchanger (a gas cooler in transcritical cycles) 24, an expansion device 26, and a heat accepting heat exchanger (an evaporator) 28. Carbon dioxide refrigerant circulates though the vapor compression system 20. The system 20 further includes a sensor assembly 56 that measures, estimates, and/or monitors the amount of refrigerant in the system 20.

The refrigerant exits the compressor 22 at a high pressure and a high enthalpy. The refrigerant then flows through the heat rejecting heat exchanger 24 at a high pressure. A fluid medium 30, such as water or air, flows through a heat sink 32 of the heat rejecting heat exchanger 24 and exchanges heat with the refrigerant flowing through the heat rejecting heat exchanger 24. In the heat rejecting heat exchanger 24, the refrigerant rejects heat into the fluid medium 30, and the refrigerant exits the heat rejecting heat exchanger 24 at a low enthalpy and a high pressure. A pump or fan 34 pumps the fluid medium through the heat sink 32. The cooled fluid medium 30 enters the heat sink 32 at the heat sink inlet or return 36 and can flow in a direction opposite to the direction of the flow of the refrigerant. After exchanging heat with the refrigerant, the heated water 38 exits the heat sink 30 at the heat sink outlet or supply 40.

The refrigerant then passes through the expansion valve 26, which expands and reduces the pressure of the refrigerant. The expansion device 26 can be an electronic expansion valve (EXV) or other type of known expansion device.

After expansion, the refrigerant flows through the passages of the evaporator 28 and exits at a high enthalpy and a low pressure. In the evaporator 28, the refrigerant absorbs heat from a heat source fluid 44, such as air or water. The heat source fluid 44 flows through a heat sink 46 and exchanges heat with the refrigerant passing through the evaporator 28 in a known manner. The heat source fluid 44 enters the heat sink 46 through the heat sink inlet or return 48 and flows in a direction opposite to the direction of flow of the refrigerant. After exchanging heat with the refrigerant, the cooled heat source fluid 50 exits the heat sink 46 through the heat sink outlet or supply 52. The temperature difference between the outdoor air 44 and the refrigerant in the evaporator 28 drives the thermal energy transfer from the outdoor air 44 to the refrigerant as the refrigerant flows through the evaporator 28. A fan or pump 54 moves the heat source fluid 44 across the evaporator 28, maintaining the temperature difference and evaporating the refrigerant. The refrigerant then reenters the compressor 22, completing the cycle.

Carbon dioxide refrigerant has relatively high vapor pressures as compared to refrigerants commonly used. The leakage rate of refrigerant in a system is generally a function of pressure. Carbon dioxide system have a higher likelihood of leakage than traditional refrigerant systems.

The carbon dioxide refrigerant has a low critical point, which can causes the vapor compression system to operate transcritically, or partially above the critical point. In a transcritical vapor compression system, the heat rejecting heat exchanger operates as a gas cooler 24, and the pressure in the gas cooler 24 is even higher, increasing the likelihood of refrigerant leakage from the system 20. When a vapor compression system 20 runs transcritically, there is an increased chance that the refrigerant can leak from the system 20. Carbon dioxide vapor compression systems generally have a high volumetric capacity, and therefore there is less charge in a vapor compression system using carbon dioxide as the refrigerant than there is in a vapor compression system using a conventional refrigerant. As there is less charge in a vapor compression system using carbon dioxide as the refrigerant, a leak has a greater influence on system performance. The subject invention automatically recharges the system by extracting carbon dioxide from an existing supply source.

Internal combustion engine fuel contains hydrocarbons. When the hydrocarbons in the fuel are burned in the presence of oxygen, an exhaust gas including combustion products is produced. The combustion products include carbon dioxide, water, and other materials such as carbon monoxide, nitrogen oxide, and any unburned hydrocarbons.

In a first embodiment, as shown in FIG. 1, an internal combustion engine 58 produces an exhaust gas stream of combustion products 60 including carbon dioxide 64. The carbon dioxide 64 is extracted from the combustion products 60 by a carbon dioxide extraction system 62. The extracted carbon dioxide 64 is then directed to and stored in a storage tank 66. A pump or compressor 90 can be used to increase the pressure of the carbon dioxide in the storage tank 66 to allow the carbon dioxide to be more easily used by the system 20. By extracting carbon dioxide 64 from the combustion products 60, the amount of carbon dioxide emitted into the atmosphere is reduced, reducing pollution.

A sensor system 56 detects the amount of refrigerant in the system 20. When the sensor 56 detects or estimates that the amount of the refrigerant in the system 20 is below a threshold value, charge has leaked from the system. The sensor system 56 sends a signal to a control 68, indicating that the refrigerant level is below the threshold value. The control 68 provides a signal to open a valve 71 in the storage tank 66 to automatically supply carbon dioxide from the storage tank 66 to the refrigerant stream in the system 20. The threshold value depends on many factors, such as the size of the vapor compression system 20, and one skilled in the art would know what threshold value to employ.

The amount of carbon dioxide added to the system 20 depends on the amount of charge that has leaked from the system 20. When the sensor system 56 detects or estimates that the amount of refrigerant in the system 20 exceeds the threshold value, the valve 71 is closed to stop carbon dioxide flow into the system 20. The carbon dioxide 64 can be added at any point in the system 20. Preferably, the carbon dioxide 64 is added add at the suction 92 of the compressor 22 as this is where the pressure of the system 20 is the lowest.

In one example, as shown in FIG. 2, the carbon dioxide extraction system 62 extracts carbon dioxide 64 by adsorbing carbon dioxide in the combustion products 60 onto a solid adsorbent, such as zeolite crystals 70. Zeolite crystals 70 are rigid crystals having a honeycomb-like network of interconnected tunnels and cages. A binder, such as alumina, can also be added to the zeolite crystals 70 to improve the mechanical strength of the zeolite crystals 70.

The zeolite crystals 70 are located inside a cylinder 72. The combustion products 60 enter the cylinder 72 through an exhaust inlet 74 and flow through the cylinder 70 and around the zeolite crystals 72. The carbon dioxide 64 in the combustion products 60 adsorbs into the zeolite crystals 72, extracting the carbon dioxide 64 from the combustion products 60. After the flow of combustion products 64 into the cylinder 72 stops, the carbon dioxide 64 is desorbed from the zeolite crystals 70. In one example, the zeolite crystals 70 are heated to desorb the carbon dioxide 64. One skilled in the art would know what heating temperature to use to desorb the carbon dioxide 64. The desorbed carbon dioxide is then directed to the storage tank 66.

In another example as shown in FIG. 2, a purge gas 76 is utilized to desorb the carbon dioxide 64 from the combustion products 60. The purge gas 76 enters the cylinder 72 through a gas inlet 78 and flows around the zeolite crystals 70 to desorb the carbon dioxide 64 from the zeolite crystals 70. The purge gas 76 has a lower pressure than the pressure of the combustion products 60. The drop in pressure removes the carbon dioxide 64 from the zeolite crystals 70, and the extracted carbon dioxide 64 exits the cylinder 72 through a carbon dioxide outlet 80.

Carbon dioxide 64 can also be extracted from the combustion products 60 by utilizing a metal salt solution. The combustion products 60 are brought into contact with the metal salt solution. The carbon dioxide 64 in the combustion products 60 adsorb onto the metal salts in the solution. After the flow of combustion products 60 is stopped, the solution is heated. When heated, the carbon dioxide desorbs, extracting the carbon dioxide 64 from the solution.

As shown in FIG. 3, carbon dioxide 64 can also be extracted from the combustion products 60 by passing the combustion products 60 through a carbon dioxide selective membrane 82. As the combustion products 60 flow through the carbon dioxide selective membrane 82, only carbon dioxide 64 permeates through the carbon dioxide selective membrane 82. The other components of the combustion products 60, such as water, carbon monoxide and unburned hydrocarbons, do not permeate through the carbon dioxide selective membrane 82, separating the carbon dioxide 64 from the combustion products 60.

Although adsorbent zeolite crystals 70, a metal salt solution, and a carbon dioxide selective membrane 82 have been described, it is to be understood that any method of extracting carbon dioxide can be employed. One skilled in the art would know how to extract the carbon dioxide 64 from the combustion products 60.

FIG. 4 schematically illustrates a second embodiment of the present invention. After the carbon dioxide 64 is extracted from the combustion products 60 by the carbon dioxide extraction system 62, the carbon dioxide 64 is directly added to the system 20. A small pump or compressor 90 may be used to raise the pressure of the carbon dioxide from the extraction system 61 to the system 20 pressure. The carbon dioxide 64 can be added at any point in the system 20. Preferably, the carbon dioxide 64 is added add at the suction 92 of the compressor 22 as this is where the pressure of the system 20 is the lowest.

The sensor system 56 detects or estimates the amount of carbon dioxide refrigerant in the vapor compression system 20. When the sensor system 56 detects or estimates that the amount of the refrigerant in the system 20 is above a threshold value, there is too much charge in the system 20. The sensor system 56 sends a signal to a control 68, indicating that the refrigerant level is above the threshold value. The control 68 provides a signal to open a valve 73 on a refrigerant line in the system 20 to purge carbon dioxide refrigerant from the system 20. The valve 73 can be located anywhere on the refrigerant line of the vapor compression system 20. When the sensor system 56 detects or estimates that the amount of refrigerant is below the threshold value, the control 68 provides a signal to close the valve 73 to stop removal of the carbon dioxide refrigerant from the system 20. The threshold value depends on many factors, such as the size of the vapor compression system 20, and one skilled in the art would know what threshold value to employ.

Although it is disclosed that the carbon dioxide is obtained from the combustion products of exhaust gas, it is to be understood that the carbon dioxide can be obtained from any source. For example, the carbon dioxide can be obtained from the air.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A vapor compression system comprising:
   a refrigerant source;
   an extraction system to extract a refrigerant from said refrigerant source;
   a replacement system to automatically add said refrigerant to the vapor compression system to maintain a predetermined minimum amount of refrigerant in the vapor compression system; and
   a sensor to measure an amount of refrigerant in the vapor compression system.

2. The vapor compression system as recited in claim 1 wherein said replacement system includes a storage tank that stores said refrigerant, and wherein said replacement system automatically adds said refrigerant to the vapor compression system from said storage tank when said amount of refrigerant in the vapor compression system is below a threshold value.

3. The vapor compression system as recited in claim 1 including a purging system to purge said refrigerant from the vapor compression system when said amount of refrigerant in the vapor compression system is above a threshold value.

4. The vapor compression system as recited in claim 1 wherein said refrigerant source is a vehicle exhaust stream and said refrigerant is carbon dioxide.

5. The vapor compression system as recited in claim 1 further including a compression device to compress said refrigerant to a high pressure, a heat rejecting heat exchanger for cooling said refrigerant, an expansion device for reducing said refrigerant to a low pressure, and a heat accepting heat exchanger for evaporating said refrigerant.

6. A method of automatically adding a refrigerant to a vapor compression system comprising the steps of:
   producing a fluid stream from an internal combustion engine;
   extracting a refrigerant from the fluid stream;
   automatically adding the refrigerant to a vapor compression system;
   circulating the refrigerant through the vapor compression system; and
   storing the refrigerant prior to said step of automatically adding the refrigerant.

7. The method as recited in claim 6 wherein the stream of fluid is an internal combustion engine exhaust stream and the refrigerant is carbon dioxide.

8. The method as recited in claim 1 wherein said internal combustion engine is utilized in a vehicle.

9. A method of automatically adding a refrigerant to a vapor compression system comprising the steps of:
   producing a fluid stream from an internal combustion engine;
   extracting a refrigerant from the fluid stream;
   automatically adding the refrigerant to a vapor compression system;
   sensing an amount of refrigerant in the vapor compression system;
   comparing the amount of refrigerant to a threshold value; and
   automatically adding the refrigerant extracted in said step of extracting to the vapor compression system when the amount of refrigerant is below the threshold value.

10. A method of automatically adding a refrigerant to a vapor compression system comprising the steps of:
    producing a fluid stream from an internal combustion engine;
    extracting a refrigerant from the fluid stream;
    automatically adding the refrigerant to a vapor compression system;
    sensing an amount of refrigerant in the vapor compression system;
    comparing the amount of refrigerant to a threshold value; and
    automatically purging a predetermined amount of refrigerant from the vapor compression system when the amount of refrigerant is above the threshold value.

11. A method of automatically adding a refrigerant to a vapor compression system comprising the steps of:
producing a fluid stream from an internal combustion engine;
extracting a refrigerant from the fluid stream, wherein said step of extracting includes adsorbing the refrigerant on an adsorbent and desorbing the refrigerant from the adsorbent; and
automatically adding the refrigerant to a vapor compression system.

12. The method as recited in claim 11 wherein the refrigerant is carbon dioxide and the adsorbent is zeolite crystals, and said step of desorbing the carbon dioxide includes heating the zeolite crystals.

13. A method of automatically adding a refrigerant to a vapor compression system comprising the steps of:
producing a fluid stream from an internal combustion engine;
extracting a refrigerant from the fluid stream, wherein said step of extracting includes adsorbing the refrigerant on a metal salt of a metal salt solution and desorbing the refrigerant from the metal salt with heat; and
automatically adding the refrigerant to a vapor compression system.

14. A method of automatically adding a refrigerant to a vapor compression system comprising the steps of:
producing a fluid stream from an internal combustion engine;
extracting a refrigerant from the fluid stream, wherein the refrigerant is carbon dioxide and said step of extracting includes directing the fluid stream through a carbon dioxide selective membrane; and
automatically adding the refrigerant to a vapor compression system.

15. A method of automatically adding a refrigerant to a vapor compression system comprising the steps of:
producing a fluid stream from an internal combustion engine;
extracting a refrigerant from the fluid stream;
automatically adding the refrigerant to a vapor compression system;
compressing the refrigerant to a high pressure;
cooling the refrigerant;
expanding the refrigerant to a low pressure; and
evaporating the refrigerant.

16. The method as recited in claim 15 further including the step of raising a pressure of the refrigerant added to the vapor compression system such that the pressure is substantially equal to said high pressure.

17. A method of automatically adding refrigerant to a vapor compression system comprising the steps of:
providing a vapor compression system having an initial amount of a system refrigerant;
generating a fluid stream including a supplemental supply of refrigerant;
compressing the system refrigerant to a high pressure;
cooling the system refrigerant;
expanding the system refrigerant to a low pressure;
evaporating the system refrigerant;
extracting the supplemental supply of refrigerant from the fluid stream; and
automatically adding the supplemental supply of refrigerant to the vapor compression system to maintain a predetermined minimum amount of refrigerant.

18. The method as recited in claim 17 further including the steps of sensing an amount of system refrigerant in the vapor compression system, comparing the amount of system refrigerant to a threshold value, and automatically adding the supplemental supply of refrigerant extracted in the step of extracting.

19. The method as recited in claim 18 wherein the stream of fluid is a vehicle exhaust stream and the refrigerant is carbon dioxide.

20. A vapor compression system comprising:
a refrigerant source;
an extraction system to extract a refrigerant from said refrigerant source, and wherein said refrigerant is carbon dioxide, and said extraction system includes a carbon dioxide selective membrane that allows said carbon dioxide to permeate through said carbon dioxide selective membrane to extract said carbon dioxide from said refrigerant source; and
a replacement system to automatically add said refrigerant to the vapor compression system to maintain a predetermined minimum amount of refrigerant in the vapor compression system.

* * * * *